US006484779B2

(12) United States Patent

Rizzo, Jr.

(10) Patent No.: US 6,484,779 B2

(45) Date of Patent: Nov. 26, 2002

(54) AUTOMATIC STENCILING MACHINE

(76) Inventor: Carl B. Rizzo, Jr., 1 Wall St., North East, PA (US) 16428

(*) Notice: Subject to any disclaimer, the term of this patent is extended or adjusted under 35 U.S.C. 154(b) by 115 days.

(21) Appl. No.: 09/753,658

(22) Filed: Jan. 4, 2001

(65) Prior Publication Data

US 2002/0084024 A1 Jul. 4, 2002

(51) Int. Cl.[7] .......................... B32B 31/00; B32B 31/04

(52) U.S. Cl. ....................... 156/538; 156/534; 156/552; 156/556; 156/570; 156/573

(58) Field of Search ................................. 156/538, 543, 156/552, 556, 558, 564, 566, 569, 570, 573, 443, 459, 446, 302, 303

(56) References Cited

U.S. PATENT DOCUMENTS

| | | | | |
|---|---|---|---|---|
| 1,325,217 A | | 12/1919 | Stokes, Jr. | |
| 1,391,743 A | | 9/1921 | Lipsius | |
| 1,783,810 A | | 12/1930 | Petersen | |
| 2,333,239 A | | 11/1943 | Fleisher et al. | |
| 2,452,959 A | | 11/1948 | Sidebotham | |
| 2,616,145 A | | 11/1952 | Duford | |
| 3,713,955 A | * | 1/1973 | Tanck, Jr. | 156/297 |
| 4,217,379 A | | 8/1980 | Salvador | |
| 4,227,960 A | * | 10/1980 | Loeffler et al. | 156/519 |
| 5,243,905 A | | 9/1993 | Webber | |
| 5,535,671 A | | 7/1996 | Kanno | |
| 5,813,329 A | | 9/1998 | Tateishi et al. | |

FOREIGN PATENT DOCUMENTS

GB 2 160 151 A 12/1985

* cited by examiner

*Primary Examiner*—Richard Crispino
*Assistant Examiner*—Sue A. Purvis
(74) *Attorney, Agent, or Firm*—Richard C. Litman

(57) ABSTRACT

An automatic brickwork stencil making machine formed in two production lines on a table top base. A roll of adhesive coated tape in each line is processed to pick up tabs positioned perpendicular to the moving tape, a tamper secures the tab on the tape, and a take-up spool driven by a motor rolls up the completed product for use in making brickwork layouts on vertical or horizontal planar surfaces.

8 Claims, 5 Drawing Sheets

AUTOMATIC STENCILING MACHINE

BACKGROUND OF THE INVENTION

1. Field of the Invention

The present invention relates generally to stencils. More specifically, the invention is an automatic stencilling machine which forms two rolls of a brick wall simulating stencil simultaneously on a table-top surface.

2. Description of the Related Art

The related art of interest describes various stencil making machines, but none discloses the present invention. There is a need for an economical and portable stencil producing machine with a compact work surface, such as a table top, with the stencils brought on-site for installing brick facades on a multitude of construction materials, such as a driveway, cement board, block foam, plywood, drywall, plasterboard, glass cement slabs, around and in pools, metal, and brick stone. The related art will be discussed in the order of perceived relevance to the present invention.

U.S. Pat. No. 1,783,810, issued on Dec. 2, 1930 to John H. Petersen, describes a stencil printing machine of the type for printing on or decorating textile fabrics. The machine synchronizes the stencil material and the stencil cylinder to move at the same rate of speed to ensure accuracy in the printed or decorative designs or patterns. The machine is distinguishable for its stencil cylinder and its associated drive mechanism.

U.S. Pat. No. 2,452,959, issued on Nov. 2, 1948 to Melvin H. Sidebotham, describes a machine for thermoplasticallyl treating materials of the sheet material type in a reel-to-reel configuration that applies and adheres a powdered thermoplastic material to the sheet. As the sheet is transferred from one reel it is heated, treated, and cooled before being rolled onto an opposite reel for storage until it is used. The machine is distinguishable for requiring a coating mechanism.

U.S. Pat. No. 4,217,379, issued on Aug. 12, 1980 to Silvano E. Salvador, describes a method for creating a simulated brick surface or the like which utilizes an adhesive tape with two series of marks for demarking the positions of a plurality of tapes to delineate simulated mortar lines. After a settable composition is applied to the surface, the tape is removed prior to the final setting of the composition. The method is distinguishable for attaching the horizontal stencil tapes with black, red and green marks on a wall with vertical strips attached to the color coded marks. The present inventive machine does not require color coding of the stencil.

U.S. Pat. No. 2,616,145, issued on Nov. 4, 1952 to Harry M. Dufford, describes a changeable four-sided pattern stencil with metal vertical and horizontal bars for use in molding decorative wall facings. The stencil is distinguishable for its variable sizing.

U.S. Pat. No. 5,243,905, issued on Sep. 14, 1993 to Ronald E. Webber, describes a stencil system and process for applying a decorative coating atop a substrate. Three sheets of transparent polycarbonate are processed to form an array of hexagons and rectangles. The stencils are distinguishable for requiring cutouts.

U.S. Pat. No. 5,535,671, issued on Jul. 16, 1996 to Hiroshi Kanno, describes a stencil duplicating machine applying a uniform tension to a stencil. The machine is distinguishable for application only to a printing drum.

U.S. Pat. No. 1,325,217, issued on Dec. 16, 1919 to Anthony Stokes, Jr., describes a heating apparatus for process embossing. The apparatus is distinguishable for its embossing structure.

U.S. Pat. No. 1,391,743, issued on Sep. 27, 1921 to Samuel Lipsius, describes a machine which is distinguishable for producing raised printing by drum printing.

U.S. Pat. No. 2,333,239, issued on Nov. 2, 1943 to Harry Fleisher et al., describes a spool truck for a screen printing apparatus which is distinguishable for its silk screening structure.

U.S. Pat. No. 5,813,329, issued on Sep. 29, 1998 to Hiroshi Tateishi et al., describes a printer for wrapping a stencil around a drum which is distinguishable for being limited to printing from a drum.

U.K. Patent Application No. 2,160,151 A, published on Dec. 18, 1985, describes a combination stencil duplicator and stencil imager which is distinguishable for its printing structure.

None of the above inventions and patents, taken either singularly or in combination, is seen to describe the instant invention as claimed. Thus a automatic stenciling machine solving the aforementioned problems is desired.

SUMMARY OF THE INVENTION

The present invention is directed to an automatic artificial brickwork stencil making machine having duplicate assembly lines which is small enough to fit on a coffee table-top like base. An upright roll of an adhesive coated plastic tape at one end of the base is fed through an upright plastic coated paper strip or tab containing cartridge to adhere the tabs to the pressure sensitive tape at predetermined intervals by a tamper element rotated by a drive spool connected by an endless drive chain. The tabbed tape continues on to an upright take up spool at the opposite end of the base. The take up spool is driven by a chain drive mechanism underneath the base. Several tape guides are positioned to maintain the direction of the travelling tape.

Accordingly, it is a principal object of the invention to provide a machine for making a brickwork stencil.

It is another object of the invention to provide an apparatus for automatically making a brickwork stencil with an adhesive coating on one side of an elongated tape.

It is a further object of the invention to provide an apparatus for automatically making a brickwork stencil with upright tabs spaced at a predetermined distance on the elongated tape.

Still another object of the invention is to provide an apparatus for automatically making a brickwork stencil in two production lines positioned on a limited base surface.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
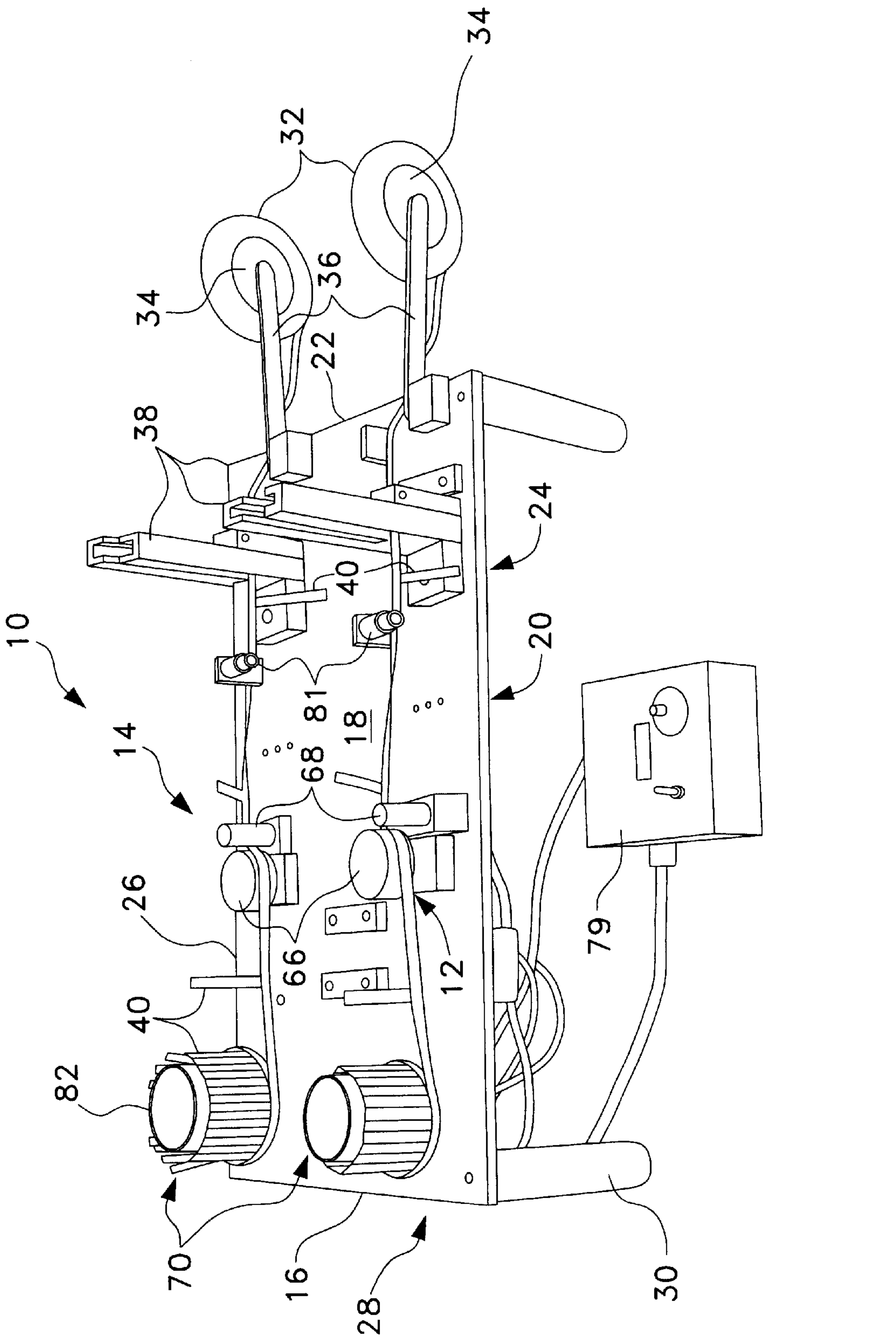
FIG. 1 is an environmental, perspective view of an automatic stenciling machine according to the present invention.

The present invention is directed to a table-top automatic stenciling apparatus 10 wherein stencil assemblies 12 and 14 are positioned in parallel on a planar rectangular base 16 having a top surface 18, a bottom surface 20, a front end 22, two parallel sides 24, 26, and a rear end 28. Legs 30 support the base corners.

The machine 10 will be described with reference to a single stencil assembly 12 or 14. A roll of tape 32 having a width of ⅜ in. and having one side of the tape coated with a pressure sensitive adhesive is mounted on a tape holder reel 34 on a tape holder arm 36 proximate the front end 22 of the base 16. An upright tab dispenser element 38 contains a stack of plastic coated paper tabs 40 which are 3 in. long, 0.01 in. thick and ⅜ in. wide.

Figure 2:
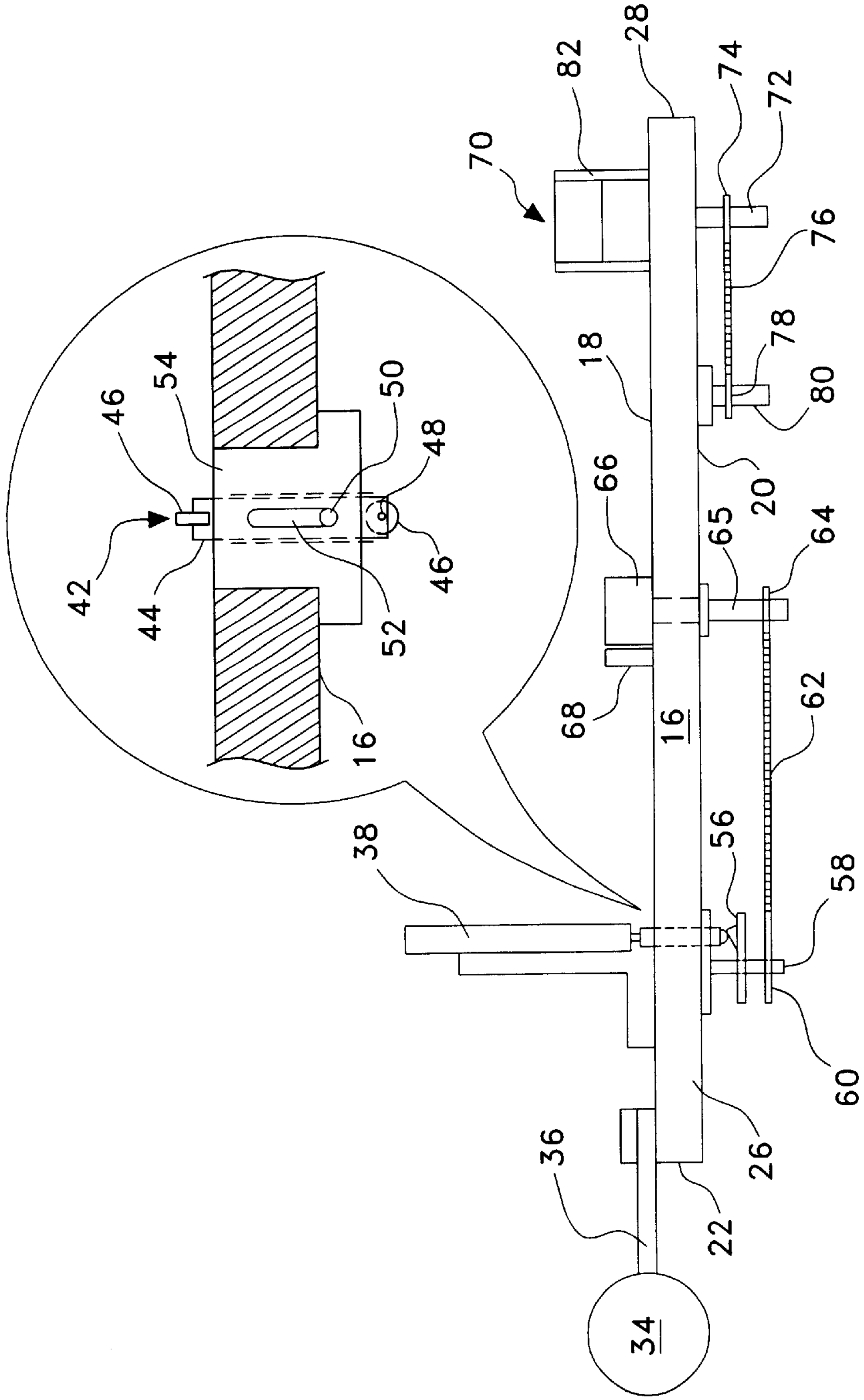
FIG. 2 is an elevational side view of the FIG. 1 machine with a detail of the tamper element.

In FIG. 2, a tamper element 42 is shown positioned underneath the dispenser element 38, and is also shown in an enlarged detail view. The tamper element 42 passes through the base 16 for applying pressure against the tape 32 and the tab 40 at predetermined intervals. The tamper element 42 comprises a cylindrical rod 44 having rotatable bearings 46 on axles 48 at both ends of the rod 44. The bearings 46 are oriented in directions 90° from each other. The tamper element 42 has a pin 50 which rides in a slot 52 of an apertured housing 54 which passes through the base 16. A cam element 56. offset from the tamper element 42 on a rotatable shaft 58, and comprises a cam wheel with a wedge at the periphery of the wheel having a 15° angle lift and a 5° drop to raise the tamper element approximately 0.5 inch whenever the wedge contacts the lower bearing wheel 46. When the upper bearing wheel 46 rises, it presses the tape 32 against the next available tab 40 in cartridge 38, causing the tab 40 to adhere to the tape 32. The diameter of the cam wheel and the position of the cam on the cam wheel are calculated to attach tabs 40 to tape 32 at precisely determined intervals. A sprocket wheel 60 on the end of the shaft 58 underneath the base 16 has an endless chain 62 which connects the sprocket wheel 60 to another sprocket wheel 64 on a shaft 65 of a drive spool 66 positioned above the base 16.

Figure 3:
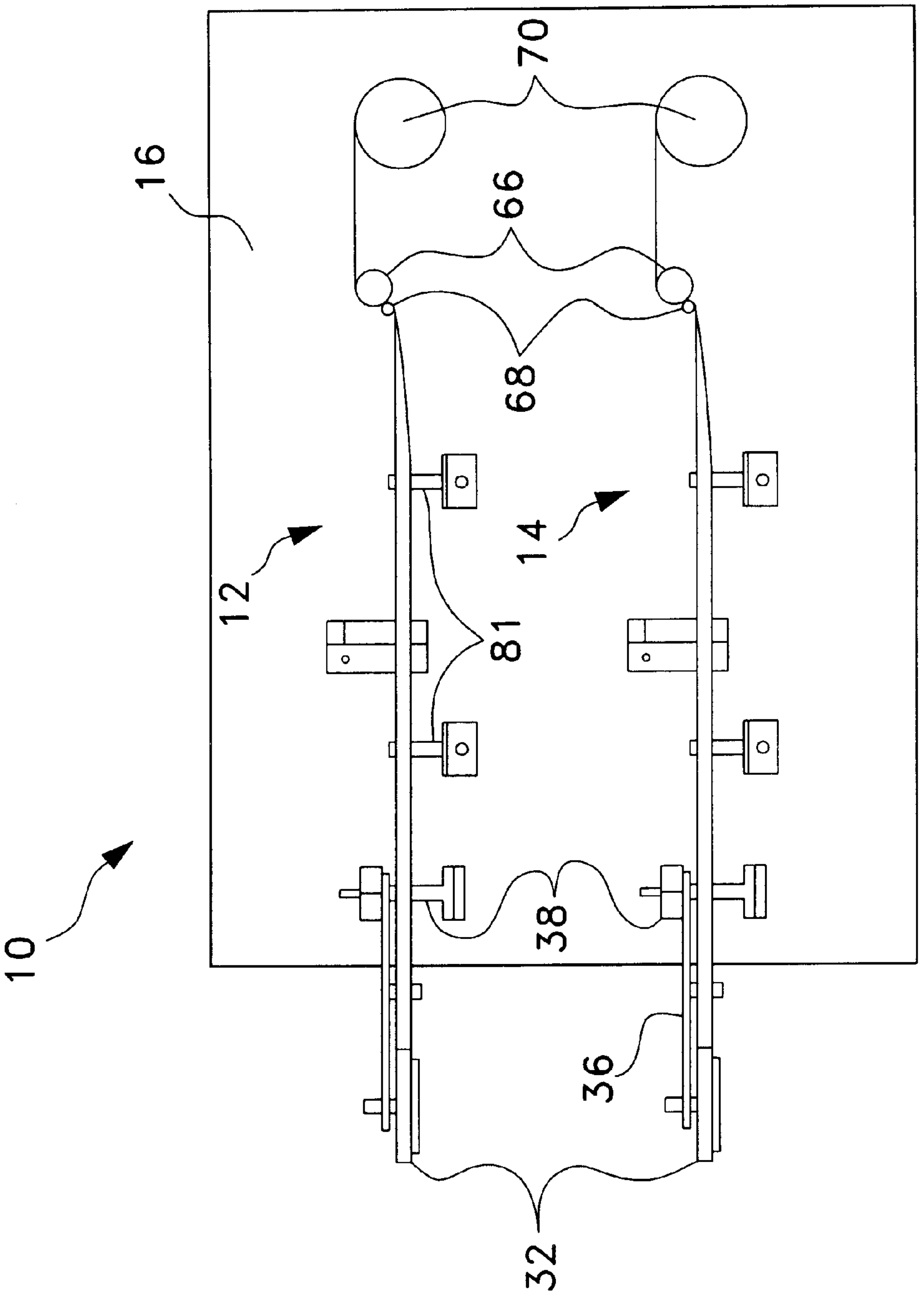
FIG. 3 is a top plan view of the FIG. 1 machine.

The drive spool 66 coacts with a 1 inch diameter tape guide 68, as depicted in FIG. 3, to flip the tape 32 from a horizontal orientation to a vertical orientation as it passes between the cartridge 38 and the take-up spool 70. Rotation of the drive spool 66 causes the rotation of the sprocket wheel 60 which moves the tamper element 42 up and down. The take up spool 70 has a shaft 72 and a sprocket wheel 74 connected by an endless chain 76 to a sprocket wheel 78 on a D.C. motor 80 with a permanent magnet. The adhesive side of the tape 32 bears against drive spool 66, thereby causing the cam element 56 to rotate via chain 62 and sprocket wheel 60. Therefore, the rotation of the take up spool 70 moves the tape 32 through the machines 12 and 14 of the apparatus 10. Operation of the motor 80 is controlled by a control box and wiring 79 as shown in FIG. 1.

Two cylindrical tape guides 81 2 inches in diameter are shown in FIG. 1 as being located on either side of the tab dispenser element 38 for guiding the tape 32 between the dispenser 38 and drive spool 66.

Figure 5:
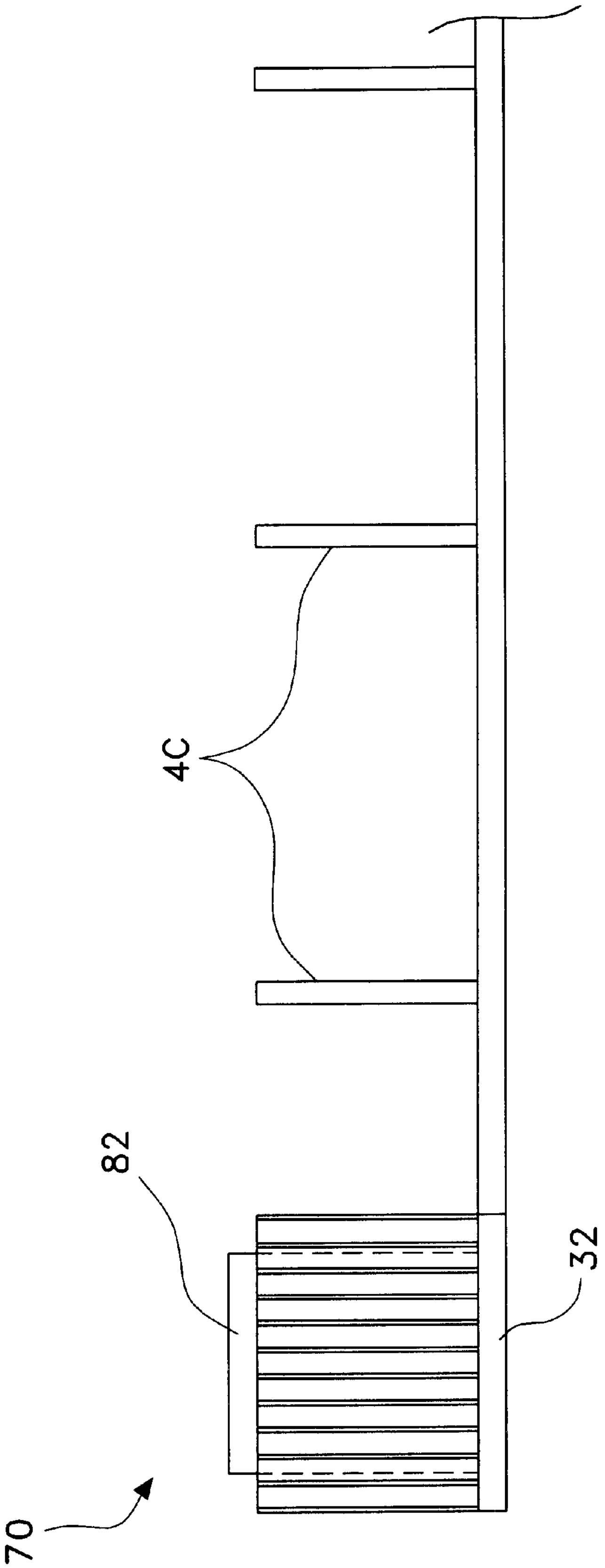
FIG. 5 is a side elevational view of the stencil being rolled up on a take up spool.

FIG. 5 shows the take up spool 70 on which a cardboard cylinder 82 is mounted to receive the tape 32 which has the tabs 40 added perpendicularly with a predetermined spacing of approximately 8 inches. The cardboard cylinder 82 can be removed from spool 70 and placed on a roller in order to apply the stencil 86 to a work surface.

In operation, a roll of tape 32 is placed on tape holder reel 34 and a portion of the tape 32 is threaded in a horizontal orientation through guides to tab dispenser 38, the tape being positioned between dispenser 38 and upper bearing wheel 46, thence through guides 81 and up to drive spool 66 and guide 68 where the tape 32 is flipped to a vertical orientation with the adhesive side bearing against drive spool 66, and then to take-up spool 70, where the tape 32 is adhered against cardboard cylinder 82. The motor 80 is turned on, causing take-up spool 70 to rotate via chain 76, pulling tape 32 from tape holder reel 34. As tape advances past the drive spool 66, the spool 66 rotates, causing cam 56 to rotate via chain 62. As the cam passes under the lower bearing wheel 46, the cylindrical rod 44 rises to press upper bearing wheel 46 against tape 32 to apply the next tab 40 to the tape at a predetermined interval. In this manner, the two stencil assemblies 12 and 14 can prepare to stencil rolls 86 in about two minutes.

Figure 4:
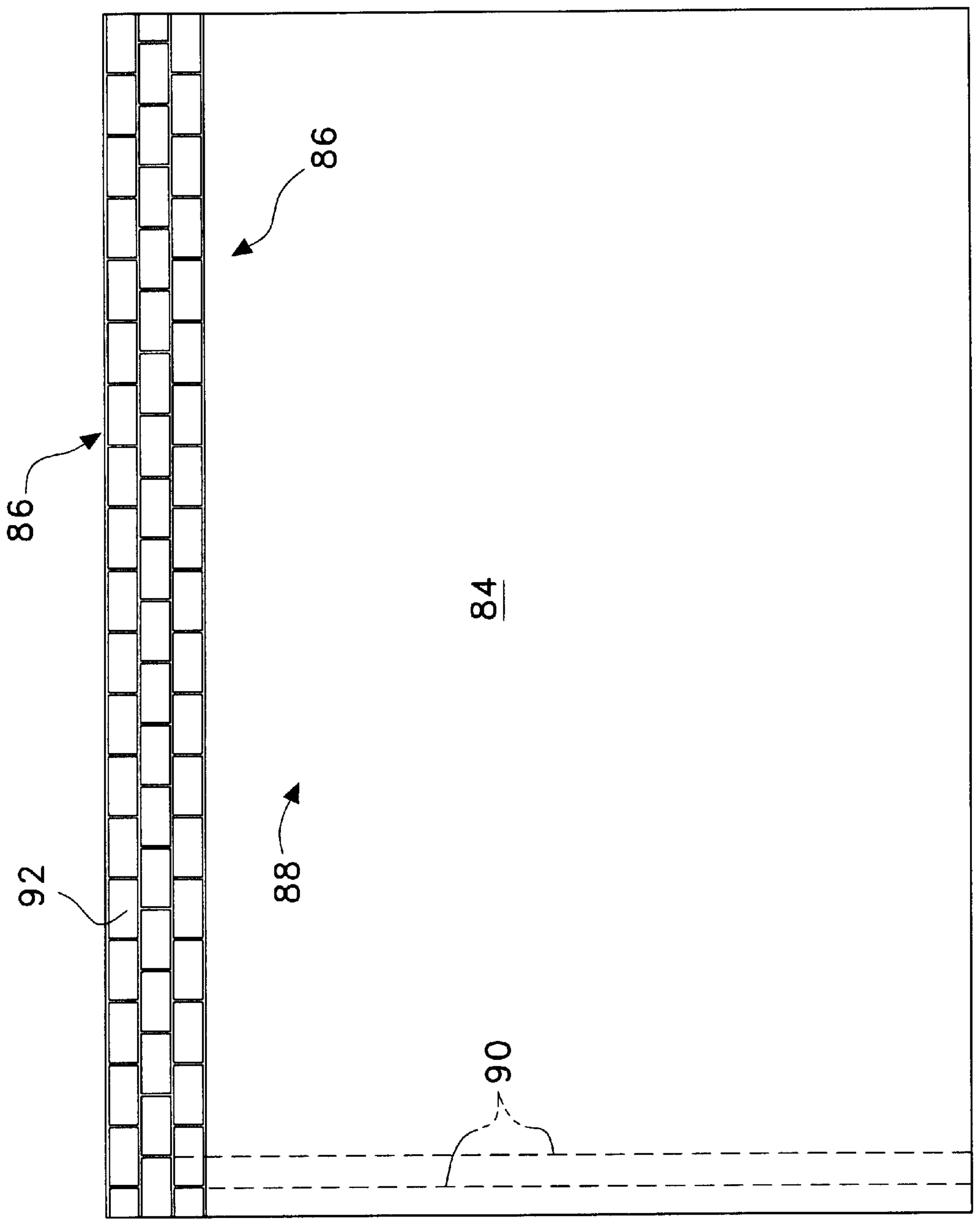
FIG. 4 is a front elevational view of the stencil applied on a wall for application of a brick layer.

FIG. 4 illustrates how a wall 84 is configured to place the stencil 86 on the wall. A first coat of a colored (preferably gray) masonry cement mixture 88 is applied on the wall 84. Chalk lines 90 are marked vertically at 4 and 8 inch intervals to locate the tabs 40. The stencils 86 are placed on appropriate horizontal chalk lines in staggered formation with the tabs aligned with the horizontal chalk lines 90. Then a brick colored mixture 92 is layered over the stencil 86 and after drying, the stencil is removed to result in a brick wall facing. It has been estimated that this brick facing can be applied for one-third of the cost of using real bricks. The bricks can be spray painted with different alternating colors.

The following exemplary dimensions and compositions of the apparatus 10 are:

Base 12: 16 in. ×30 in. ×0.5 in. aluminum.
Tab dispenser element 38: 7.5 in. in height, 4 in. wide and 1 in.
thick; aluminum.
Tape holder reel 34: 3.25 inch diameter aluminum wheel.
Tape holder arm 36: 8 inch long, aluminum.
Drive spool 66: 2 in. diameter, aluminum.
Tape guides 68, 81: 1 and 2 in. diameters, aluminum.
Sprocket wheels 64, 74, 78 and shafts: steel.
Cam element 56 and tamper element 42: steel.
Take up spool 70: plastic with steel grab arms.
Legs 30: steel.

It is to be understood that the present invention is not limited to the embodiment described above, but encompasses any and all embodiments within the scope of the following claims.

I claim:

1. An automatic brickwork stencil making machine comprising:
 - a planar rectangular base having a top surface, a bottom surface, a front end, two parallel sides, and a rear end;
 - a tape holder reel mounted on a tape holder arm attached to the front end of said base, the reel for holding a roll of tape having one side of the tape coated with a pressure sensitive adhesive;
 - an upright paper cartridge dispenser element mounted on said base for containing paper tabs;
 - a tamper element positioned underneath the dispenser element and reciprocating through the base for applying pressure against the tape and the tab at predetermined intervals;

a drive spool rotatably mounted on said base;

means for reciprocating said tamper element in synchronization with rotation of said drive spool;

a take-up spool having an axle positioned on the rear end of the base for receiving the tape after application of the tabs; and a chain drive mechanism for rotating said take-up spool.

2. The automatic brickwork stencil making machine according to claim 1, wherein said chain drive mechanism comprises:

a motor having a shaft;

a first sprocket mounted on said shaft;

a second sprocket mounted on the axle of said take-up spool; and an endless chain mounted on said first and second sprockets.

3. The automatic brickwork stencil making machine according to claim 1, wherein the tamper element comprises a rod having bearings rotatable at both ends of the rod.

4. The automatic brickwork stencil making machine according to claim 1, wherein said drive spool is mounted on an axle and wherein said means for reciprocating said tamper element comprises:

a third sprocket mounted on the drive spool axle;

a fourth sprocket mounted on an axle under said base;

a cam wheel having a wedge, the cam wheel being mounted on the same axle as said fourth sprocket, said tamper element having a bearing wheel in contact with said cam wheel; and an endless chain extending mounted on said third and fourth sprockets, said tamper element reciprocating when the bearing wheel rises and falls on the wedge.

5. The automatic brickwork stencil making machine according to claim 1, wherein a cam element offset from the tamper element has a 15° angle lift and a 5° drop to raise the tamper element approximately 0.5 inch.

6. The automatic brickwork stencil making machine according to claim 1, wherein the tamper element comprises a cylindrical shaft having rotatable bearings at each end oriented in a direction 90° from each other.

7. The automatic brickwork stencil making machine according to claim 6, wherein the tamper element has a pin which rides in a slot of a housing on the base adapted to limit the pin's travel.

8. The automatic brickwork stencil making machine according to claim 1, wherein two machines are positioned in parallel on the base.

* * * * *